United States Patent
Thirion et al.

(12) 
(10) Patent No.: US 11,435,433 B2
(45) Date of Patent: Sep. 6, 2022

(54) METHOD AND DEVICE FOR LOCATING AN ELEMENT WHICH CAN BE TRANSPORTED BY AN AIRCRAFT

(71) Applicant: SAFRAN ELECTRONICS & DEFENSE, Paris (FR)

(72) Inventors: Louis Théophile Thirion, Paris (FR); Nicolas Paris, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/618,733

(22) PCT Filed: Jun. 19, 2020

(86) PCT No.: PCT/EP2020/067211
§ 371 (c)(1),
(2) Date: Dec. 13, 2021

(87) PCT Pub. No.: WO2020/254641
PCT Pub. Date: Dec. 24, 2020

(65) Prior Publication Data
US 2022/0206106 A1    Jun. 30, 2022

(30) Foreign Application Priority Data
Jun. 21, 2019 (FR) ...................................... 1906747

(51) Int. Cl.
*G01S 13/08* (2006.01)
*G01S 5/14* (2006.01)

(52) U.S. Cl.
CPC ..................... *G01S 5/14* (2013.01)

(58) Field of Classification Search
CPC . G01S 13/08; G01S 13/00; G01S 7/08; G01S 7/4865; G01S 7/4915
USPC ......................................................... 455/101
See application file for complete search history.

(56) References Cited

U.S. PATENT DOCUMENTS

| | | | |
|---|---|---|---|
| 6,522,027 | B1 | 2/2003 | Morillon et al. |
| 2004/0033796 | A1 | 2/2004 | Remy |
| 2006/0038077 | A1 | 2/2006 | Olin et al. |

(Continued)

FOREIGN PATENT DOCUMENTS

| | | | | |
|---|---|---|---|---|
| FR | 2838524 A1 | 10/2003 | | |
| WO | WO-2009070754 A1 | * | 6/2009 | ............ G01S 15/876 |
| WO | WO-2012057627 A1 | * | 5/2012 | ............... G01S 11/02 |

OTHER PUBLICATIONS

Sep. 17, 2020 International Search Report issued in International Patent Application No. PCT/EP2020/067211.

*Primary Examiner* — Harry K Liu
(74) *Attorney, Agent, or Firm* — Oliff PLC

(57) ABSTRACT

A method for locating an element which can be transported by aircraft includes, for a first position of an aircraft: a) transmitting, from an antenna located in the aircraft, a first message intended for the transportable element; b) receiving, on the antenna, a second message transmitted by the transportable element upon receipt of the first message; c) obtaining a travel time of the first and second messages; d) determining a distance from the travel times; e) determining that the element is inside the aircraft if the distance is less than a value and that the element is outside the aircraft if the distance is greater than the value.

9 Claims, 3 Drawing Sheets

(56) References Cited

U.S. PATENT DOCUMENTS

| | | | |
|---|---|---|---|
| 2006/0071790 A1* | 4/2006 | Duron | G06K 17/00 |
| | | | 340/572.1 |
| 2016/0063786 A1 | 3/2016 | Lewis et al. | |
| 2018/0088222 A1* | 3/2018 | Anholt | G01S 13/74 |
| 2018/0213355 A1 | 7/2018 | Smith et al. | |
| 2018/0348352 A1* | 12/2018 | Ogston | G01S 13/75 |
| 2022/0171794 A1* | 6/2022 | Kumaresan | G06F 16/285 |

* cited by examiner

[Fig. 1]
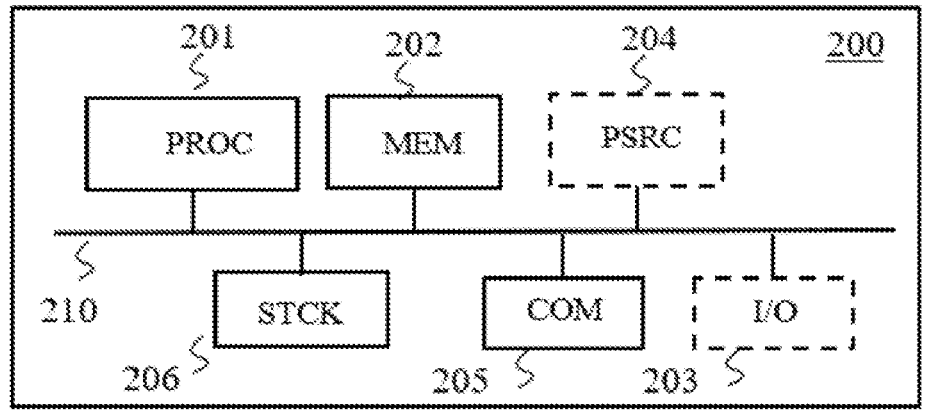
[Fig. 2]
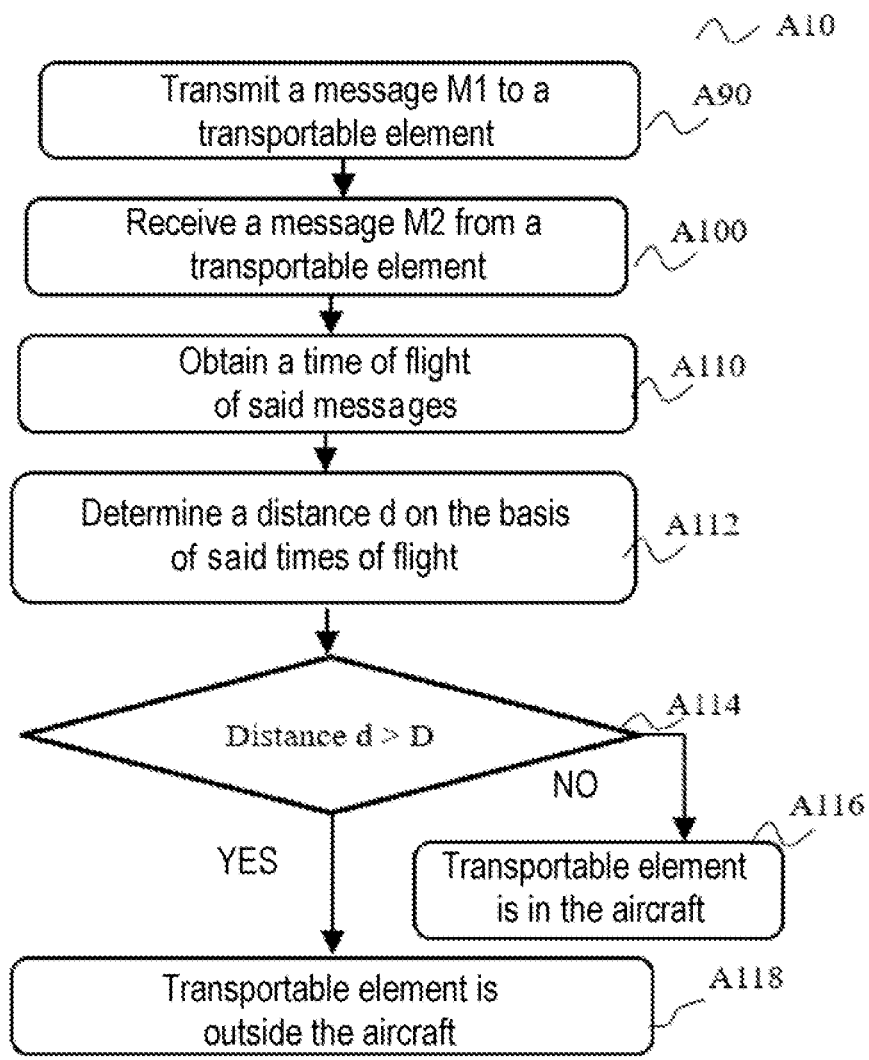

[Fig. 3]
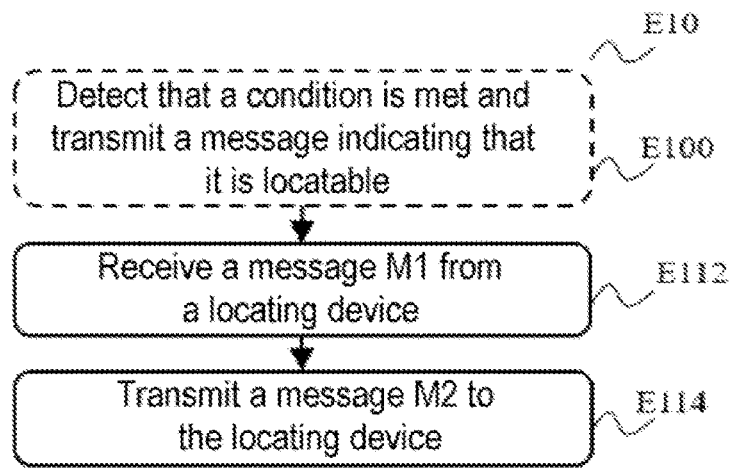
[Fig. 4]
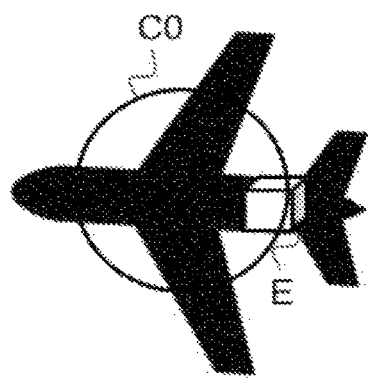
[Fig. 5]
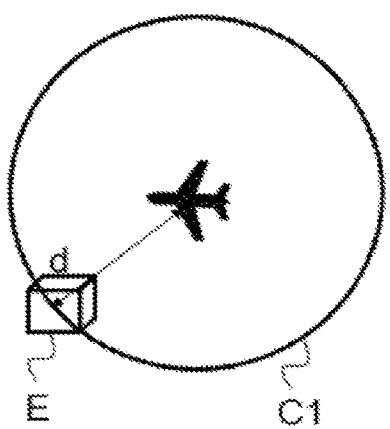

[Fig. 6]
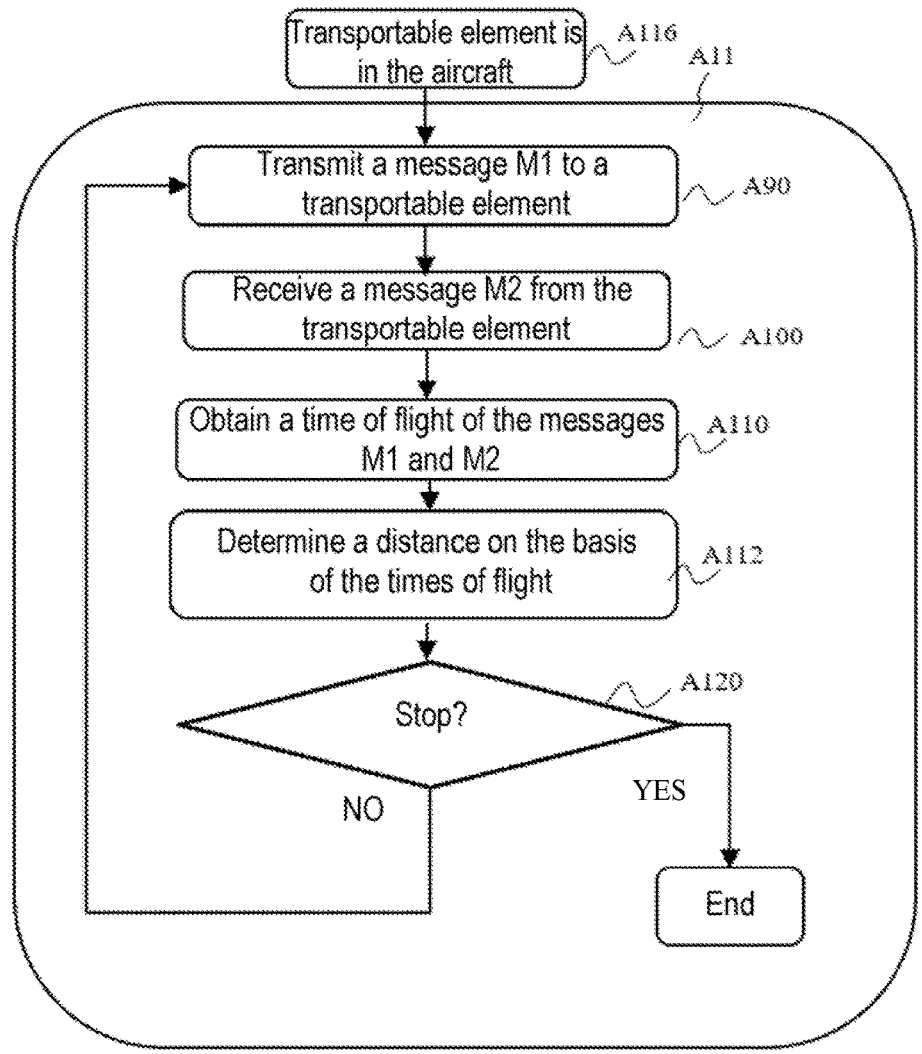
[Fig. 7]
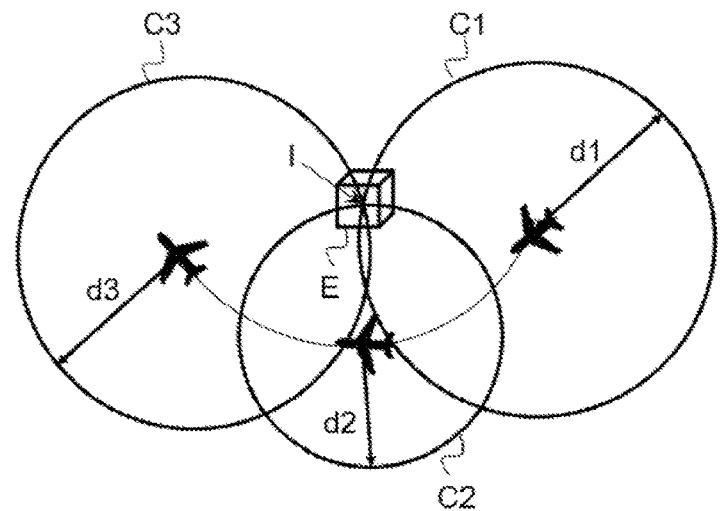

US 11,435,433 B2

METHOD AND DEVICE FOR LOCATING AN ELEMENT WHICH CAN BE TRANSPORTED BY AN AIRCRAFT

TECHNICAL FIELD

The invention relates to a method and a device for locating an element which can be transported by an aircraft.

PRIOR ART

An aircraft such as an airplane or a helicopter can transport a lot of equipment. This equipment may, for example, be ULDs (Unit Load Devices) such as a container or a pallet, which are used for the air transport of goods. A freight company responsible for shipping goods may wish to ensure that the goods are indeed in the aircraft prior to its departure.

In addition, safety standards define which equipment must without fail be on board an aircraft, and how many items of each type. If some equipment is missing, an aircraft may not be allowed to take off. It is therefore necessary to check before take-off that the equipment is indeed on board the aircraft.

To this end, technicians or flight personnel can check that the equipment is indeed on board the aircraft. Such interventions are time-consuming, expensive and tedious.

They are also a source of errors.

There are solutions which avoid human intervention. A solution based on a GPS (Global Positioning System) is known. However, such a solution consumes a lot of power.

Sigfox, with its low-speed network, makes it possible to geolocate connected objects without using GPS by analyzing the power of the radio signal transmitted by the object and received by three different antennas. Such a solution requires heavy infrastructure with, in particular, the use of servers. It is, furthermore, imprecise.

A LoRaWAN is a Long-Range Wide-Area Network. It consists of low-power wireless equipment which communicates with application servers through gateways. Such a network can be used to geolocate equipment which can be transported by aircraft. Such a solution requires the presence of at least three antennas, or even more for locating the object more precisely.

It is, then, desirable to overcome these drawbacks of the prior art.

DISCLOSURE OF THE INVENTION

A method for locating an element which can be transported by aircraft is described.

The method comprises, for a first position of an aircraft:

a) transmitting a first message to said transportable element from an antenna located in the aircraft;
b) receiving, on said antenna, a second message transmitted by said transportable element upon receipt of said first message;
c) obtaining a time of flight of said first and second messages;
d) determining a distance on the basis of said times of flight;
e) determining that said element is in the aircraft in the case where the distance is smaller than a value and that said element is outside the aircraft in the case where the distance is greater than said value.

According to one embodiment, determining that the element is in the aircraft in the case where the distance is smaller than the value comprises determining whether a circle, having the antenna as its center and having the determined distance as its radius, intersects the fuselage of the aircraft.

According to one embodiment, in the case where the element is determined to be outside the aircraft, the method further comprises:

repeating steps a) to d) for at least two other positions of the aircraft, the at least two other positions being different from the first position and being different from each other;
determining the position of the element on the basis of the three determined distances.

According to one embodiment, determining the position of the element on the basis of the three determined distances comprises:

determining the position of the element at the intersection of at least three circles, each circle having a position of the antenna as its center and one of the determined distances as its radius.

According to one embodiment, the method comprises repeating steps a) to c) for a new position of the aircraft which is different from the previous positions as long as the position of the transportable element is determined with an error greater than a given value.

According to one embodiment, the method further comprises:

receiving a message from the transportable element indicating that it is locatable.

A device for locating an element which can be transported by aircraft is also described. The device comprises:

means for transmitting a first message to said transportable element from an antenna located in the aircraft;
means for receiving, on said antenna, a second message transmitted by said transportable element upon receipt of said first message;
means for obtaining a time of flight of said message;
means for determining a distance on the basis of said time of flight;
means for determining that said element is in the aircraft in the case where the distance is smaller than a value and that said element is outside the aircraft in the case where the distance is greater than said value.

According to one embodiment, a system for locating an element which can be transported by aircraft is described. The system comprises an above-mentioned device for locating an element which can be transported by aircraft and a sensor attached to the transportable element.

According to one embodiment, the sensor is configured to send a message to the locating device indicating that the transportable element is locatable.

A computer program is also described, which can be stored on a medium and/or downloaded from a communication network, in order to be read by a device. This computer program comprises instructions for implementing the above-mentioned method according to any one of its variants when the program is executed by a computing unit of the device. The invention also relates to storage means comprising such a computer program.

BRIEF DESCRIPTION OF THE DRAWINGS

The above-mentioned features of the invention, and others, will become more clearly apparent on reading the following description of an exemplary embodiment, said description being given in relation to the attached drawings, among which:

FIG. 1 schematically illustrates the hardware architecture of a device, which is situated in an aircraft, for locating an element which can be transported by the aircraft;

FIG. 2 schematically illustrates a method for locating an element which can be transported by an aircraft;

FIG. 3 schematically illustrates a communication method implemented in a transportable element to be located;

FIG. 4 illustrates an aircraft in which there is a transportable element;

FIG. 5 illustrates an aircraft and a transportable element located outside the aircraft;

FIG. 6 schematically illustrates a method for determining the position of an element which can be transported by an aircraft if the transportable element is outside the aircraft; and FIG. 7 illustrates a moving aircraft and a transportable element located outside the aircraft.

DETAILED DISCLOSURE OF EMBODIMENTS

FIG. 1 schematically illustrates the hardware architecture of a device for locating an element which can be transported by aircraft. The aircraft is, for example, an airplane, a helicopter or a drone. The locating device is situated in the aircraft. It is configured to execute all or some of the steps of the method A10 illustrated by FIG. 2.

Thus, the locating device 200 comprises one or more processors 201, e.g. a CPU (Central Processing Unit), a GPU (Graphics Processing Unit) and/or a DSP (Digital Signal Processor). The locating device 200 also comprises a memory MEM 202 of RAM (Random-Access Memory), ROM (Read-Only Memory) and/or EPROM (Erasable Programmable Read-Only Memory) type. The locating device 200 may optionally comprise one or more input/output interfaces 203, for example a keyboard, a mouse, a touchpad, a webcam, etc., each being configured to display information and/or allow a user to enter commands or data. The locating device 200 can also comprise a power source 204 which can also be external to the locating device. The locating device 200 also comprises one or more communication interfaces 205. The communication interface typically allows communication between the locating device 200 and the element to be located. To this end, the communication interface may, for example, comprise a radio antenna intended to establish communication channels with the equipment to be located. According to one particular embodiment, the antenna is configured so that its lobe covers the entire fuselage of the aircraft and the exterior of the aircraft as little as possible. This solution makes it possible to optimize the gain of the antenna over all the elements to be located situated in the fuselage. However, other antenna patterns could be chosen.

The locating device 200 can also comprise a storage module STCK 204 which can be of magnetic medium, flash memory, optical disk, HDD (Hard Disk Drive) or SSD (Solid-State Drive) type, or of external storage medium reader type, such as an SD (Secure Digital) card reader. These various elements are connected to one another by a communication bus 210.

The processor CPU 201 can store data, or information, in the memory MEM 202 or in the storage module STCK 204. The processor CPU 201 can read data stored in the memory MEM 202 or in the storage module STCK 204. These data can correspond to configuration parameters.

The processor CPU 201 is capable of executing instructions loaded into the memory MEM 202, for example from the storage module STCK 204. When the locating device 200 is powered on, the processor CPU 201 is capable of reading instructions from the memory MEM 202 and of executing them. These instructions form a computer program causing all or some of the locating methods and steps described below, particularly the method described in FIG. 2, to be implemented by the processor CPU 201. Thus, all or some of the methods and steps described below can be implemented in software form by executing an instruction set by means of a programmable machine, such as a DSP (Digital Signal Processor) or a microcontroller. All or some of the methods and steps described below can also be implemented in hardware form by a machine or a dedicated component, such as an FPGA (Field-Programmable Gate Array) or an ASIC (Application-Specific Integrated Circuit).

According to one variant, the computer program is stored outside the locating device 200 on a non-transitory digital data medium, for example an external medium such as an HDD, CD-ROM, DVD, or a storage device of USB type. The locating device 200 can therefore be configured to read a computer program.

The locating device 200 can also be connected to an aeronautical radio communication device not shown in FIG. 1. The aeronautical radio communication device is, for example, configured to communicate with a ground station via the communication means of the aircraft (for example Satcom, ACARS (*Aircraft Communications Addressing and Reporting System*), etc.). The aeronautical radio communication device makes it possible, for example, to inform the ground station of the presence or absence of the object to be located in the aircraft and, where applicable, of its exact position. The locating device 200 is connected to the aeronautical radio communication device via a local area network of the aircraft 1, for example a wired local area network of Ethernet type, or a wireless local area network of Wi-Fi type. In one particular embodiment, the locating device 200 is an access gateway.

FIG. 2 schematically illustrates a method A10 for locating an element which can be transported by the aircraft. The locating method A10 is implemented in an aircraft by a locating device 200. The position of the aircraft is, for its part, known, for example by virtue of a GPS system with which the aircraft is equipped. The locating device 200 is in wireless communication with the transportable element E. To this end, the transportable element is equipped with a sensor, e.g. a radio transceiver equipped with an antenna, which consumes very little power and is capable of communicating with the locating device 200. The transportable element is also equipped with at least one battery and a processor. The elements constituting the transportable element are optimized in terms of power consumption in order to have sufficient battery life. The sensor of the transportable element E exchanges data with the locating device 200, for example an access gateway. It is capable of transmitting and receiving information.

In one particular embodiment, the locating device 200 and the transportable element E communicate with each other according to a protocol of LoRaWAN type which allows connected objects to exchange data of small size at low speed. LoRa networks are low-power, low-speed, long-range wireless networks optimized for equipment with limited resources. These networks are particularly suitable for applications which do not require a high speed. However, the embodiments described below are not limited to the use of the LoRaWAN protocol. Other protocols can be used which allow wireless communication between a connected object equipped with a sensor and an antenna.

FIG. 3 schematically illustrates a communication method E10, implemented in the transportable element E. In FIGS. 2 and 3 the optional steps are shown in dotted lines. During an optional step E100, the transportable element detects whether a condition is met. If the condition is met, the transportable element declares itself ready to be located. To this end, it can transmit a message via its sensor in the form of a radio signal indicating that it can be located. A condition is, for example, the comparison of a pressure (or temperature) of the transportable element with a predefined pressure (or temperature) value, for example the ground pressure. If the pressure is equal to or greater than the predefined pressure value, then the transportable element is ready to be located. According to one variant, the transportable element can detect whether or not it is secured, for example by means of a strap, and declare itself locatable if it is strapped. According to another variant, the transportable element is associated with a shock detector. The shock detector makes it possible to detect the shocks undergone by the transportable element. In the absence of shocks after a continuous period of shocks, the transportable element can declare itself ready to be located. In fact, in order to save battery, the sensor of the transportable element E is not permanently on. In one variant, the step E100 is not implemented, for example because the date on which the transportable element is locatable is known to the wireless network. During a step A90, the locating device 200 transmits a message M1 to the transportable element in the form of a radio signal. This message indicates, for example, to the sensor to provide one or more types of information, e.g. pressure measurement, temperature measurement, vibration level, attachment status, information on shocks received, information on the empty or loaded state of the transportable element, or information on the open or closed state of the transportable element. Upon receipt (E112) of this message M1, the transportable element will immediately transmit, during a step E114, a message M2 to the locating device 200. The message M2 comprises the one or more pieces of information requested by the locating device 200. The message M2 can optionally give context information, for example indicate that the transportable element has been subjected to vibrations, thus indicating that it has been moved. This context information can also be sent by the transportable element at any other time. This context information can, for example, be used to reinitialize the locating process. If the transportable element has been moved, and is stationary again, the locating device 200 can then reinitialize the locating process.

During a step A100, the locating device 200 receives the message M2 from the transportable element in the form of a radio signal.

During a step A110, the locating device 200 obtains a time of flight ToF. The ToF corresponds to the time of flight of the message M1 transmitted by the locating device 200 during the step A90 to reach the sensor (located in or on the transportable element), plus the time of flight of the message M2 transmitted by the sensor during the step E112 to reach the locating device 200. In other words, the ToF is equal to the difference between the date of transmission of the message M1 and the date of reception of the message M2 by the locating device 200.

During a step A112, the locating device 200 determines a distance d on the basis of the time of flight. This distance d corresponds to the distance between the locating device 200 and the transportable element E. The distance d is obtained by multiplying the time of flight by a propagation speed of the radio signal. This speed is known to the locating device 200. In the case of a radio signal, the speed is, for example, equal to 300,000 km/s.

During a step A114, the distance d determined in the step A112 is compared with a value D. If the distance d is greater than D, then the element E is considered to be outside the aircraft (A118). If the distance d is smaller than D, then the element E is considered to be in the aircraft (A116). The distance D is, for example, equal to half the length of the aircraft. In one variant, the distance D is equal to the radius of the smallest circle the center of which is the locating device 200, more specifically its antenna, and which encompasses the entire aircraft.

According to one particular embodiment, the element E is considered to be in the aircraft (A116) when a circle, having the locating device 200, more specifically its antenna, as its center and having the distance measured in the step A112 as its radius, intersects the fuselage of the aircraft. This scenario is illustrated in FIG. 4. In FIG. 4, the circle C0 intersects the fuselage of the aircraft. The element E is considered to be outside the aircraft (A118) when a circle, having the antenna of the locating device 200 as its center and having the distance measured in the step A112 as its radius, does not intersect the fuselage of the aircraft as illustrated in FIG. 5. In FIG. 5, the circle C1 does not intersect the fuselage of the aircraft.

Before take-off, the pilot must check the immediate surroundings of the aircraft. In the particular case where the transportable element is under the aircraft, its presence will have been detected by the pilot.

During the steps A116 and A118, the information on the position of the transportable element can be transmitted to a ground station via an aeronautical radio communication device. This information can also be transmitted to the pilot of the aircraft, e.g. on a screen. The pilot can then take the decision not to take off after receiving information indicating to him/her that equipment which must be on board is absent.

FIG. 6 schematically illustrates a method A11 for determining the position of an element which can be transported by the aircraft if the method A10 has determined that the transportable element E is outside the aircraft. The method A11 is implemented by the locating device 200 following A116.

In FIG. 6, the steps identical to the steps of FIG. 2 are identified with the same reference numerals. If the transportable element is outside the aircraft (A116), the steps A90, A100, A110 and A112 are repeated for various positions of the aircraft until a stop criterion (A120) is satisfied. This scenario is illustrated in FIG. 7, where the steps A90, A100, A110 and A112 are repeated for 3 different positions of the aircraft. The stop criterion is, for example, a number of repetitions of the steps A90, A100, A110 and A112. Specifically, in order to obtain the precise position of the transportable element E, these steps must be applied at least three times.

Each repetition of the steps A90, A100, A110 and A112 makes it possible to determine that the transportable element E is on a circle (C1, C2 or C3) having the locating device 200, or more specifically its communication antenna, as its center and having the distance (d1, d2 or d3) determined in A112 as its radius. The transportable element is therefore at the intersection I of the at least 3 circles C1, C2 and C3 in FIG. 7.

According to one particular embodiment, if the position of the transportable element E is not determined precisely enough with 3 positions of the aircraft, the steps A90, A100, A110 and A112 can be repeated for a new position of the aircraft which is different from the previous positions. The position of the transportable element E is imprecise if it is determined with an error greater than a given value. The position is precisely determined if the distance between two successive measurements of the position of the transportable element E is smaller than a defined value. According to one variant, the position is precisely determined if the signal-to-noise ratio of the radio signal received by the locating device 200 is greater than a given value.

In this embodiment, the locating device 200 can ask the transportable element to remain locatable for a given time. According to one variant, the locating device 200 can ask the transportable element to be locatable again after a certain time.

The information relating to the location of the transportable object can be transmitted by an aeronautical radio communication device to a ground station. This information can also be transmitted to the pilot of the aircraft, e.g. on a screen.

The locating methods A10 and A11 do not use GPS, except the one with which the aircraft is equipped, to locate the transportable element. Power consumption is thereby reduced. The methods advantageously make it possible to use a simple infrastructure with a single locating device in the aircraft. The location of the transportable element is also precise due to the movement of the aircraft.

The invention claimed is:

1. A method for locating an element which can be transported by aircraft, said method comprising, for a first position of an aircraft:
   a) transmitting a first message to said transportable element from an antenna located in the aircraft;
   b) receiving, on said antenna, a second message transmitted by said transportable element upon receipt of said first message;
   c) obtaining a time of flight of said first and second messages;
   d) determining a distance on the basis of said times of flight;
   e) determining that said element is in the aircraft in the case where the distance is smaller than a value and that said element is outside the aircraft if in the case where the distance is greater than said value;
   and, in the case where said element is determined to be outside the aircraft:
   repeating steps a) to d) for at least two other positions of the aircraft, said at least two other positions being different from said first position and being different from each other; and
   determining the position of said element on the basis of said three determined distances.

2. The method as claimed in claim 1, wherein determining that said element is in the aircraft in the case where the distance is smaller than said value comprises determining whether a circle, having said antenna as its center and having said determined distance as its radius, intersects the fuselage of the aircraft.

3. The method as claimed in claim 1, wherein determining the position of said element on the basis of said three determined distances comprises:
   determining the position of said element at the intersection of at least three circles, each circle having a position of said antenna as its center and one of said determined distances as its radius.

4. The method as claimed in claim 3, which comprises repeating steps a) to c) for a new position of the aircraft which is different from the previous positions as long as the position of said transportable element is determined with an error greater than a given value.

5. The method as claimed in claim 1, which further comprises:
   receiving a message from said transportable element indicating that it is locatable.

6. A non-transitory storage medium storing instructions for implementing, by means of a device, the method as claimed in claim 1 when instructions are executed by a computing unit of said device.

7. A device for locating an element which can be transported by aircraft, said device comprising at least one processor configured to, for a first position of an aircraft:
   a) transmit a first message to said transportable element from an antenna located in the aircraft;
   b) receive, on said antenna, a second message transmitted by said transportable element upon receipt of said first message;
   c) obtain a time of flight of said first and second messages;
   d) determine a distance on the basis of said times of flight;
   e) determine that said element is in the aircraft in the case where the distance is smaller than a value and that said element is outside the aircraft in the case where the distance is greater than said value;
   and, in the case where said element is determined to be outside the aircraft:
   repeat steps a) to d) for at least two other positions of the aircraft, said at least two other positions being different from said first position and being different from each other;
   determine the position of said element on the basis of said three determined distances.

8. A system for locating an element which can be transported by aircraft, said system comprising a device for locating an element which can be transported by aircraft as claimed in claim 7 and a sensor attached to said transportable element.

9. The system as claimed in claim 8, wherein said sensor is configured to send a message to said locating device indicating that said transportable element is locatable.

* * * * *